United States Patent [19]

Cason, III

[11] 4,127,826
[45] Nov. 28, 1978

[54] GAIN SPIKE AND MODE CONTROL FOR SPIKED LASERS

[75] Inventor: Charles M. Cason, III, Huntsville, Ala.

[73] Assignee: The United States of America as represented by the Secretary of the Army, Washington, D.C.

[21] Appl. No.: 796,581

[22] Filed: May 13, 1977

[51] Int. Cl.² ............................................. H01S 3/10
[52] U.S. Cl. ............................................. 331/94.5 C
[58] Field of Search ...................... 331/94.5 C, 94.5 G, 331/94.5 D, 94.5 M, 94.5 ML

[56] References Cited

U.S. PATENT DOCUMENTS 4,019,157  4/1977  Hutchinson et al. ........... 331/94.5 G Primary Examiner—William L. Sikes
Attorney, Agent, or Firm—Nathan Edelberg; Robert P. Gibson; Harold W. Hilton

[57] ABSTRACT

A laser system using a cw HeNe laser for transmitting a beam through a dichroic into an unstable resonator. A second laser, a cw $CO_2$ laser, has its beam transmitted through the dichroic to follow the HeNe beam into the unstable resonator laser aperture. The resonator's secondary and primary mirrors are adjusted into a parallel orientation which gives a series of circles in both laser beams. The gain-spike is suppressed to eliminate air breakdown.

5 Claims, 3 Drawing Figures

GAIN SPIKE AND MODE CONTROL FOR SPIKED LASERS

DEDICATORY CLAUSE

The invention described herein may be manufactured, used, and licensed by or for the Government for governmental purposes without the payment to me of any royalties thereon.

BACKGROUND OF THE INVENTION

Present pulsed lasers have a gain-spiked output having peak power density level eight times that of the quasi-steady level of the following pulse. Propagation measurements show the gain-spike is responsible for air breakdown. A reduction in the spike power level to the quasi-steady level will increase the pulsed power density which may be propagated by approximately a factor of eight above the present level.

SUMMARY OF THE INVENTION

A cw HeNe laser beam is reflected from a dichroic which is coated to be near 100% reflected at HeNe frequencies. A cw $CO_2$ laser is aligned to be transmitted through the dichroic and positioned to follow the HeNe beam. Both beams are injected into an unstable laser resonator aperture (1 mm dia) in the center of a primary mirror in the resonator. A lens may be provided to focus both beams on a small hole in the mirror. A scraper mirror reflects the beams to a thermal imager which reflects the beams to a pair of NaCl beamsplitters. The beams are directed to a large area photon drag detector.

DESCRIPTION OF THE PREFERRED EMBODIMENT

Figure 1:
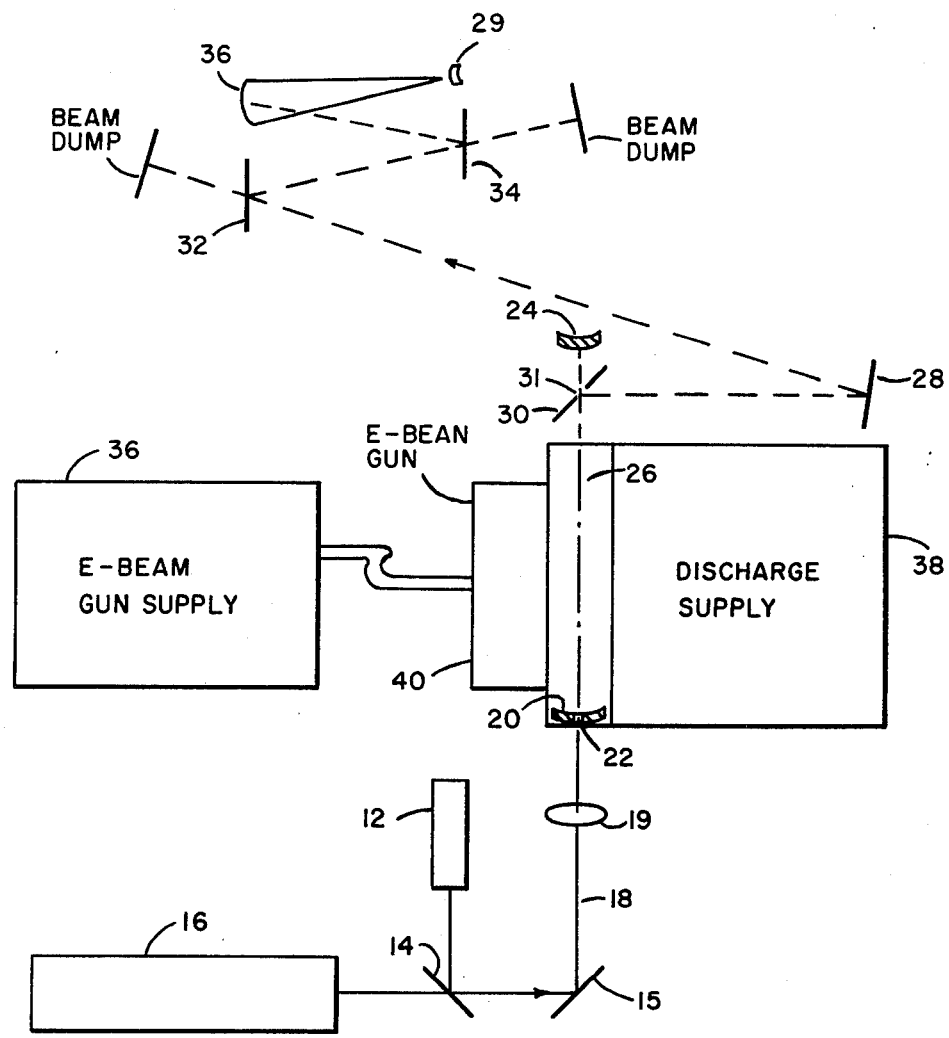
FIG. 1 is a diagrammatic view of the laser system of the present invention.

As seen in FIG. 1, a cw HeNe laser 12 has its beam reflected from a dichroic 14 which is coated to be near 100% reflected at HeNe frequencies. A cw $CO_2$ laser 16 is aligned to be transmitted through the dichroic 14 and positioned to follow the HeNe beam to a reflector 15 and in direction 18. Both beams pass through a lens 19 (not required) and are injected into an unstable resonator laser aperture through a small hole 22 (1 mm dia) in the center of the primary mirror 20. The resonator is provided with a secondary mirror 24 and the primary mirror 20 which are adjusted to a parallel configuration which gives a series of circles in both laser beams. The path of the injected beam is along the resonator's optical center-line 26 then uniformally walks off by diffraction, forming circles seen at the flat 28. A scraper mirror 30 with a central hole 31 may be used to catch the output beam to eliminate a spider holder for secondary mirror 24 which would cause a shadow. A thermal imager may be used at 28 to observe the cw $CO_2$ laser pattern to establish complete resonator mode filling. The output beam may be observed at a small location on its annular shape or by a proportional fraction of the total output pulse energy. A fast detector 29 such as a high-speed He-Cd-Te or a photon-drag detector may be used. Filters such as plastic sheet, teflon, etc. may be used as well as near-normal beamsplitters of NaCl, 32 and 34 followed by a focussing mirror 36, to focus the annular output on the large area photon-drag detector 29. An acceptance area of 1 to 4 $cm^2$ is required.

An instrument, such as a spectrometer, may be used to measure the laser output (transverse modes or P-transition within a V—V system) at 15. A liquid crystal surface may be used to measure the transverse modes.

The laser used to conduct the experiments was an E-beam controlled $CO_2$ laser which operates at 1-atm pressure. Typical conditions are 4 kv/cm field, 175 kv E-beam, at 0.4 $A/cm^2$, and a gas mix of 1/2/3 for $CO_2/N_2/He$. Other conditions and gases mixed with $CO_2$ at other proportions are acceptable. Other laser wavelengths will similarly work as long as an injection laser of the precise laser wavelength and transverse cavity mode is used. The E-beam used a Marx bank supply 36 capable of 240 kv and a discharge supply 38 which is a 12$\mu$ fd capacitor capable of 75 kv. The pulsed laser is initiated by the E-gun 40 having a foil emitting area of 10-cm X 100-cm. The discharge, pumped by supply 36, is a 25 cm X 125-cm area electrodes separated by 10 cm. The optical aperture of the cavity formed by mirrors 22 and 24 is 10-cm X 10-cm and has a gain path length of 100 cm. Mirror separation 24 and 24 is 212 cm.

The purpose of this apparatus is to reduce the peak gain spike power for an unstable resonator operated in the gain-switched mode. A secondary purpose is to control mode-beating. A further purpose is to cause the pulsed oscillator to operate at a single longitudinal frequency.

Figure 2:
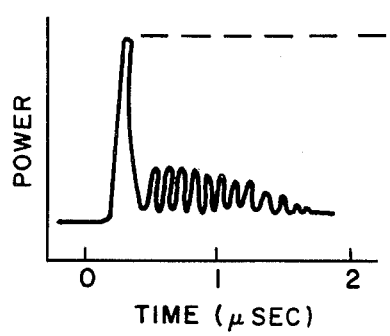
FIG. 2 illustrates the normal output of a pulsed laser operating in the gain-switched mode.
Figure 3:
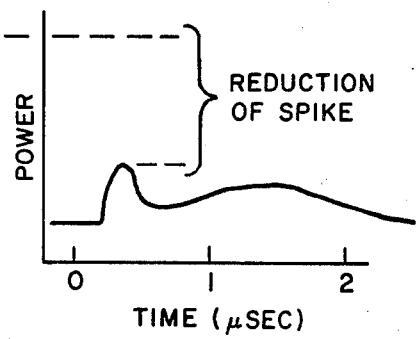
FIGS. 3 illustrates the spike reduction accomplished by apparatus of the present invention.

FIG. 2 shows the type of output normally developed from a pulsed laser operating in the gain-switched mode. FIG. 3 shows the reduction to be expected and elimination of mode-beating spiking.

This apparatus of the present invention will accomplish the following for low levels of injected power 0.001 $X/cm^2$:

1. Eliminate mode-beating for about 1$\mu$ sec.
2. Control polarization plane of the output for about 1$\mu$ sec. There will be a very low level of intensity in the plane perpendicular to the injected beam.
3. Cause an observable reduction in spike peak height.
4. Cause the oscillator to operate at a single and precise longitudinal frequency.

For higher levels of injected power 1.0 $w/cm^2$ the following will be accomplished:

1. Gain spike eliminated in all the output annulus except for a small region near the discharge anode and greatly reduced there.
2. Spatial control of the gain-spike amplitude due to 2-D E-beam/kinetic effects.
3. Elimination of perpendicular plane of polarization to the injected signal polarization.
4. Provide a means to determine the transverse mode characteristic of a pulsed unstable resonator.
5. Provide a means to control the exact longitudinal frequency of the oscillator.
6. Provide a means to study longitudinal multi moding effects.
7. Provide a means to study polarization relaxation.

Consider FIG. 1. Introduce an etalon in the resonator cavity to increase its "Q". Tune the cw injected longitudinal frequency by adjusting the mirror separation to maximize the resonator c-w output. At the same time adjust the cw injection mirror separation to obtain a maximum cw output. A hill-climbing servo technique can be used to automate each adjustment. This will permit the following:

5. Near exact frequency matching between the large cavity longitudinal frequency to that of the cw laser injection signal.
2. No churping of the output frequency.
3. No return of unwanted modes.
4. Near exact frequency matching of the pulsed output laser from pulse to pulse (1 part in $10^{10}$ maximum drift) over a long time, a condition required for pulsed laser radar.

The purpose of gain spike control is to permit an increase of energy per pulse of fixed time width and fixed area which can be propagated through the atmosphere and still avoid air breakdown. It has been proven that the gain-switched spike causes air breakdown. The spike is from 4X to 8X the average power of a pulse. Therefore, reducing it by a factor of two or more below the breakdown threshold will allow an increase in the transmitted pulse energy. Although the operation is based on a cw injected signal, it only requires the oscillator cavity to be filled with an injected signal during the build-up of positive gain. A pulsed laser signal could be injected with corresponding advantages in savings of weight and volume as well as cost.

The low power cw laser, 16, may be replaced by a high peak power but low energy TEA laser. When pulsed synchronously such that the cavity mirrors 20, 24 are filled with the laser 16 output at the time gain is produced by the E-beam 36 and discharge supply 38 frequency matching is not required. If the pulsed laser 16 is operating multi-mode then the high energy laser will also operate with the same multi-mode frequency spectrum. Longitudinal frequency matching is not required due to the high peak output power from the TEA laser injection signal, but it is desired to provide long term stable operation during the pulse. If the starting temperature is 300° K. laser should be operated at the P-20, P-22, and P-24 lines simultaneously to provide control up to 10 or 20$\mu$ sec. If the starting temperature is lower 200° K. the lower P-lines would be required. A double grating system has been shown to be effective in producing multi P-transition beams that have the exact same optical path. Each P-transition component could be a pure frequency or could be a mode-locked result of operating at numerous longitudinal frequencies. Injecting this type of signal will provide effective control as the pulsed laser shifts its P-transition frequency to follow the increasing temperature during the pulse. A pulsed laser that extracts its maximum energy per unit volume will sweep through numerous P-transitions. It is obvious that the cw laser 16 may be replaced by a double grating cw laser to generate multi-frequency operation. Precise longitudinal frequency matching would still be required for low power operation.

It is also obvious this multi-frequency application will provide similar control on pulsed chemical lasers, electric pulsed carbon monoxide or other laser having a complex V—V spectra due to anharmonic laser molecules.

I claim:

1. A gain-spike and mode control system for lasers comprising:
   (a) A cw HeNe laser disposed for transmitting a first beam in a first direction;
   (b) A cw $CO_2$ laser disposed for transmitting a second beam in a second direction;
   (c) dichroic means for reflecting said first beam in a third direction and for transmitting said second beam therewith whereby said second beam follows said first beam;
   (d) an unstable resonator positioned in a path along said third direction and disposed to transmit said beams therethrough, said beams comprising the output of said unstable resonator.

2. A laser system as in claim 1 including primary and secondary mirrors arranged in spaced relation in said resonator and disposed for adjustment to maximize said resonator output.

3. A laser system as in claim 2 including reflecting means for directing said beams in a predetermined path, focussing means for focussing the beams, detector means for receiving said beams, and, filter means disposed between said reflecting and focussing means.

4. A laser system as in claim 3 wherein said detector means is a photon-drag detector.

5. A laser system as in claim 3 wherein said filters are NaCl beamsplitters.

* * * * *